(12) United States Patent
Chen et al.

(10) Patent No.: US 8,223,272 B2
(45) Date of Patent: Jul. 17, 2012

(54) IMAGE PROCESSING CIRCUIT AND IMAGE PROCESSING METHOD THEREOF

(75) Inventors: Wei-Fu Chen, Taipei County (TW); Chih-Chia Kuo, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 388 days.

(21) Appl. No.: 12/685,632

(22) Filed: Jan. 11, 2010

(65) Prior Publication Data

US 2010/0289961 A1 Nov. 18, 2010

(30) Foreign Application Priority Data

May 18, 2009 (TW) ................................ 98116402 A (51) Int. Cl.
*H04N 5/21* (2006.01)
(52) U.S. Cl. ........................................................ 348/607
(58) Field of Classification Search .................. 348/607, 348/611, 614, 625, 627, 666, 687, 678, 673, 348/712; 382/266, 275, 263, 264, 254, 255
See application file for complete search history.

(56) References Cited

U.S. PATENT DOCUMENTS

| | | | | |
|---|---|---|---|---|
| 5,146,319 A * | 9/1992 | Engel et al. | .................. | 348/712 |
| 5,237,414 A * | 8/1993 | Faroudja | ....................... | 348/606 |
| 5,374,964 A * | 12/1994 | Rzeszewski | ................... | 348/625 |
| 5,469,225 A * | 11/1995 | Hong | ............................. | 348/625 |
| 6,987,542 B2 * | 1/2006 | Nieuwenhuizen | ............ | 348/607 |
| 7,345,711 B2 * | 3/2008 | Takahashi | ...................... | 348/625 |
| 7,515,768 B2 * | 4/2009 | Nishi et al. | ..................... | 382/275 |
| 2005/0270425 A1 | 12/2005 | Min | | |
| 2009/0180030 A1 * | 7/2009 | Shin et al. | ...................... | 348/663 |
| 2010/0189373 A1 * | 7/2010 | Ayzenberg | ..................... | 382/266 |

* cited by examiner

*Primary Examiner* — Paulos Natnael
(74) *Attorney, Agent, or Firm* — Jianq Chyun IP Office (57) ABSTRACT

An image processing circuit and an image processing method thereof are disclosed. A difference value adaptor of the image processing circuit produces a weighing value and a flag value corresponding to the pixel according to the pixel difference value of each pixel of an input video signal. The image processing circuit judges which area among a first area, a second area and a third area the pixel difference value of each pixel falls in according to the flag value. The image processing circuit performs a low-pass filtering processing on the pixel having the pixel difference value falling in the first area, performs a high-pass filtering processing on the pixel having the pixel difference value falling in the second area and performs a luminance transient improvement processing (LTI processing) on the pixel having the pixel difference value falling in the third area.

20 Claims, 11 Drawing Sheets

IMAGE PROCESSING CIRCUIT AND IMAGE PROCESSING METHOD THEREOF

CROSS-REFERENCE TO RELATED APPLICATION

This application claims the priority benefit of Taiwan application serial no. 98116402, filed on May 18, 2009. The entirety of the above-mentioned patent application is hereby incorporated by reference herein and made a part of specification.

BACKGROUND OF THE INVENTION

1. Field of the Invention

The present invention generally relates to an image processing circuit and an image processing method thereof, and more particularly, to an image processing circuit and an image processing method thereof for performing adaptive processing according to the image characteristic.

2. Description of Related Art

When watching images, a viewer pays attention to not only the color and the hue of the images, but also to the profiles or the edges of the objects in the images. The image processing is used to enhance the image features for improving or increasing the visual effect of the images. For example, images obtained by a digital camera or a scanner usually are processed with a post procedure so as to look more clear and rich-colorful.

One of the image processing techniques is sharpening processing, wherein in an image undergone the sharpening processing, the profiles or the edges of the image objects have higher contrast to distinguish the image object from others. On the other hand, 'sharpness' usually represents the sharpened extent of an image. For a viewer, an image with higher sharpness usually looks more clear than that with lower sharpness.

Although the sharpening processing can gain a higher contrast of the profiles or the edges of the image objects, but it may cause negative effect as well. For an image where the edges of the objects are clear already, a further sharpening processing may make the edges thereof generate unacceptable visual effect such as light contour.

Figure 1:
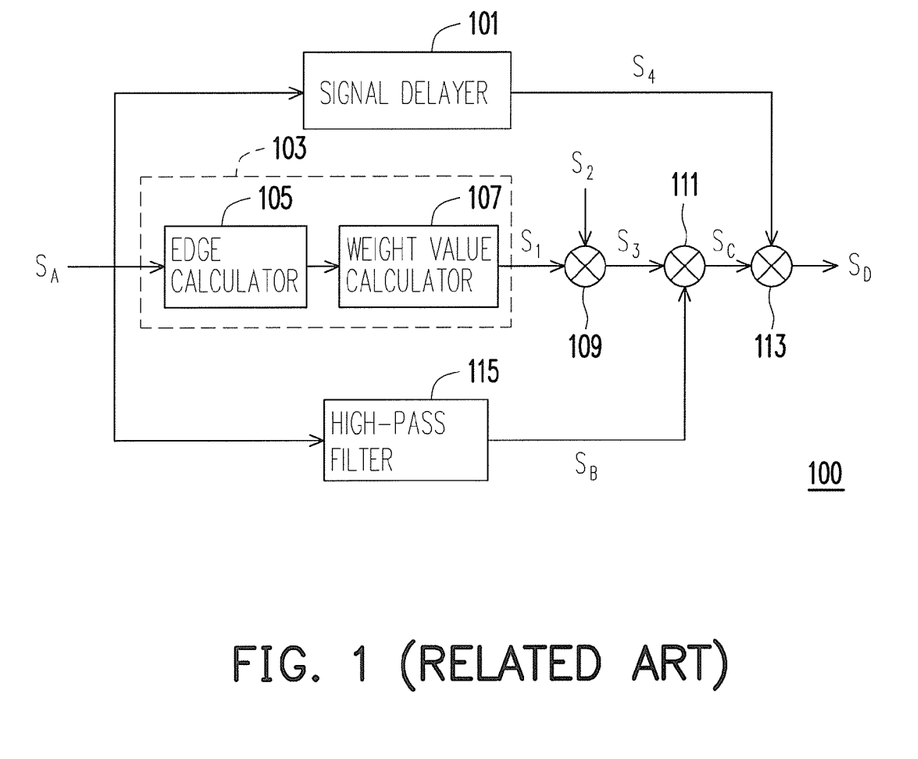
FIG. 1 is a function block diagram of a conventional video signal processing device.
Figure 2A:
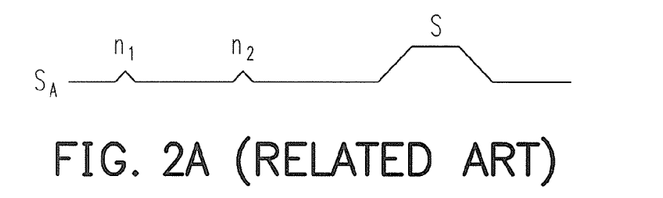
FIGS. 2A-2E are timing charts of the partial signals in the video signal processing device of FIG. 1.

US Patent Application No. 2005/0270425 discloses a video signal processing device 100, as shown by FIG. 1. Referring to FIG. 1, a video signal processing device 100 receives an input video signal $S_A$, performs a sharpening processing on the input video signal $S_A$ and then produces an output video signal $S_D$. FIGS. 2A-2E are timing charts of the partial signals in the video signal processing device 100 of FIG. 1. Referring to FIG. 2A, the input video signal $S_A$ herein includes a general video signal S and noises $n_1$ and $n_2$, wherein the general video signal S carries the image information. The video signal processing device 100 would increase the sharpness of the images in the general video signal S and avoid the noises $n_1$ and $n_2$ from being sharpened.

Figure 2B:
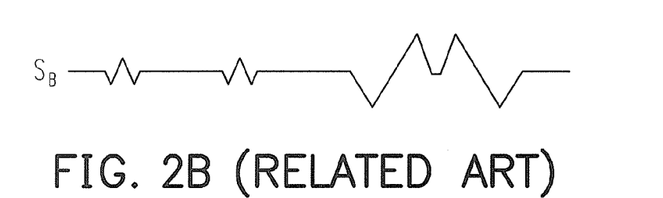

The video signal processing device 100 includes a signal delayer 101, a weighing unit 103, a first multiplier 109, a second multiplier 111, an adder 113 and a high-pass filter 115. Referring to FIGS. 1 and 2B, the high-pass filter 115 receives the input video signal $S_A$ and performs a high-pass filtering processing on the input video signal $S_A$ so as to produce a high-frequency signal $S_B$. The high-frequency signal $S_B$ is used as base for judging the profiles/edges of the image objects. In more details, the amplitudes of the video signal S are corresponding to the pixel values of the frame pixels. When the amplitudes of the video signal get varied, it indicates there are differences between the pixel values of adjacent pixels in a frame. In particular, a larger amplitude variation of the video signal S is corresponding to the portion of profiles/edges of the image objects in the frame, so that the high-pass filter 115 would filter out the component with larger amplitude variation to produce the high-frequency signal $S_B$. As a result, the produced high-frequency signal $S_B$ would be used as base by the video signal processing device 100 for sharpening processing.

Figure 2C:
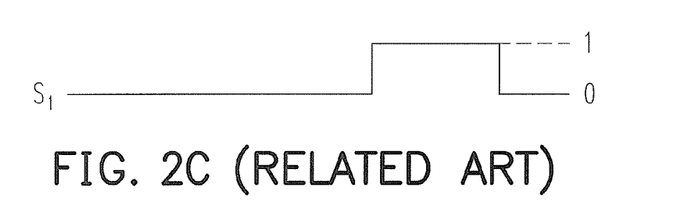

Referring to FIGS. 1 and 2C, the weighing unit 103 includes an edge calculator 105 and a weight calculator 107. The edge calculator 105 receives the input video signal $S_A$, detects the image information in the input video signal $S_A$ and calculates the pixel differences between the present pixel and the adjacent pixels thereof so as to judge which area the present pixel belongs to. After that, the weight calculator 107 accordingly produces a weighing signal $S_1$ according to the judgement result of the edge calculator 105, wherein the weight value contained by the weighing signal $S_1$ would be accordingly varied depending on different areas the pixels belong to.

Figure 2D:
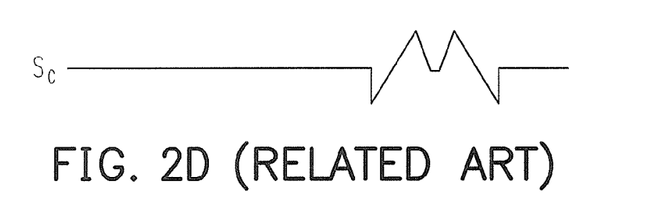
Figure 2E:
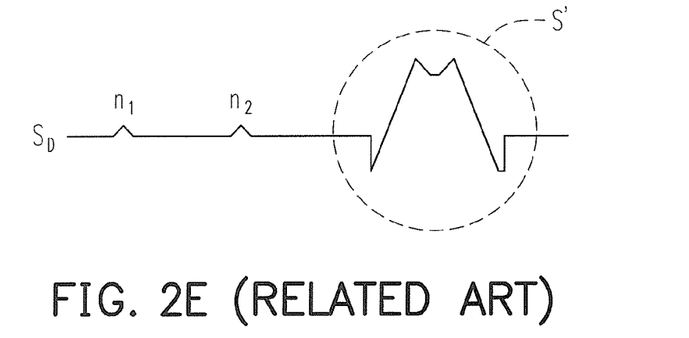

A gain signal $S_2$ is input to the first multiplier 109 for determining the gain for the sharpening processing performed by the video signal processing device 100. The first multiplier 109 multiplies the weighing signal $S_1$ by the gain signal $S_2$ to produce a total gain signal $S_3$. Referring to FIGS. 1 and 2D, the second multiplier 111 multiplies the total gain signal $S_3$ by the high-frequency signal $S_B$ to produce a peaked signal $S_C$. Meanwhile, the signal delayer 101 delays the input video signal $S_A$ so as to output a delayed video signal $S_4$ to the adder 113. Referring to FIGS. 1 and 2E, the adder 113 adds the delayed video signal $S_4$ to the peaked signal $S_C$ so as to accomplish a sharpening processing and produce the output video signal $S_D$, wherein the output video signal $S_D$ includes a video signal S' and the noises $n_1$ and $n_2$, and the video signal S' is obtained from the general video signal S after receiving a sharpening processing performed by the video signal processing device 100.

Figure 3:
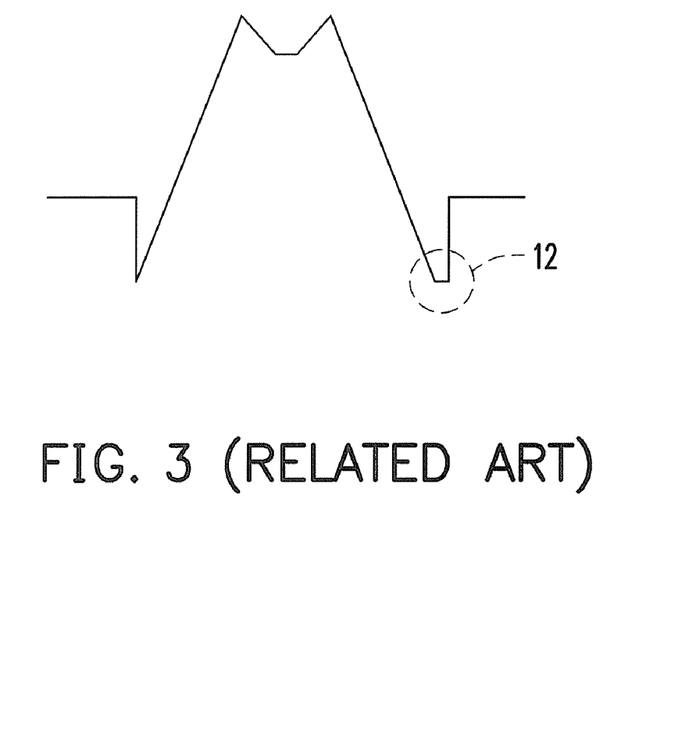
FIG. 3 is a localized-enlarged diagram of the video signal S' of FIG. 2E.

The sharpening processing method used by the video signal processing device 100 is usually termed as peaking processing method. Taking FIGS. 2A and 2E as an example, in comparison with the video signal S, the pixel values in the portions of profiles/edges of the frame objects corresponding to the video signal S' after receiving a sharpening processing are increased or depressed; therefore, the processing method causes light contours/dark contours appearing on the frame. FIG. 3 is a localized-enlarged diagram of the video signal S' of FIG. 2E. Referring to FIG. 3, the video signal S' contains an area 12, and the pixel values of all the pixels corresponding to the area 12 are equal to the minimal pixel value of the frame. Assuming the output video signal $S_D$ is the video signal able to display frames with 256 gray-levels, then the minimal pixel value would be equal to zero, while, on the other hand, the maximal minimal pixel value would be equal to 255. As a result, the pixels corresponding to the area 12 of the video signal S' produce dark contours during being displayed on a display.

Figure 4:
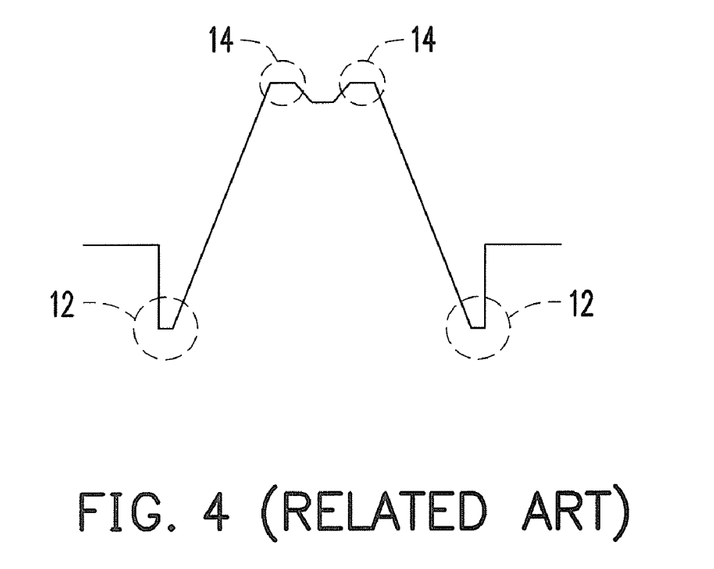
FIG. 4 is a timing diagram of another sharpened video signal processed by the video signal processing device of FIG. 1.

In addition to the dark contours, the video signal processed by the video signal processing device 100 may also produce light contours on the display. FIG. 4 is a timing diagram of another sharpened video signal processed by the video signal processing device 100 of FIG. 1. Referring to FIG. 4, in addition to the area 12, the waveform of a sharpened video signal further contains another area 14, wherein the pixel values of all the pixels corresponding to the area 14 are equal to the maximal pixel value of the frame. As a result, the pixels corresponding to the area 14 of the video signal S' produce light contours during being displayed on the display.

SUMMARY OF THE INVENTION

Accordingly, the present invention is directed to an image processing method, which is able to produce a corresponding weight value according to the pixel difference value of each pixel of an input video signal, judge the area where the pixels are located in and further perform corresponding low-pass filtering processing, peaking processing or luminance transient improvement processing (LTI processing) on the pixels. By using the image processing method, the light contours or dark contours of the frames are avoided after the sharpening processing.

The present invention is also directed to an image processing circuit, which is able to produce a corresponding weight value according to the pixel difference value of each pixel of an input video signal, judge the area where the pixels are located in and further perform corresponding low-pass filtering processing, peaking processing or LTI processing on the pixels according to the different areas where the pixels are located in. In this way, high-quality frames are obtained.

The present invention provides an image processing method for processing an input video signal so as to produce an output video signal. The input video signal contains pixel values of a plurality of sequentially-inputted pixels. The image processing method produces a weighing signal and an area-identifying signal according to the pixel difference values of the plurality of pixels of the input video signal. The weighing signal contains weight values of the pixels, the area-identifying signal contains flag values of the pixels, and each of the flag values is configured to identify which of a first area, a second area and a third area the pixel difference value of the pixel corresponding to the flag value falls in. Besides, the image processing method uses a low-pass filter to perform a low-pass filtering processing on a first pixel among the pixels wherein the pixel difference value of the first pixel falls in the first area, so that the pixel value of a first output pixels in the output video signal is obtained. The image processing method further uses a high-pass processing circuit to perform a peaking processing on a second pixel among the pixels wherein the pixel difference value of the second pixel falls in the second area, so that the pixel value of a second output pixel in the output video signal is obtained. Moreover, the image processing method further uses a transient improvement circuit to perform an LTI processing on a third pixel among the pixels wherein the pixel difference value of the third pixel falls in the third area, so that the pixel value of a third output pixels in the output video signal is obtained.

In an embodiment of the present invention, the first area and second area are partially overlapped. The image processing method further includes performing the low-pass filtering processing and the peaking processing on those pixels among the pixels, wherein the pixel difference values of those pixels fall in the overlapped portion of the first area and the second area.

In an embodiment of the present invention, the second area and third area are partially overlapped. The image processing method further includes performing the peaking processing and the LTI processing on those pixels among the pixels, wherein the pixel difference values of those pixels fall in the overlapped portion of the second area and the third area.

In an embodiment of the present invention, the second area has a first sub-area, a second sub-area and a third sub-area. The second sub-area is located between the first sub-area and the third sub-area. The weight values of the pixels corresponding to the second sub-area are greater than the weight values of the pixels corresponding to the first sub-area and the third sub-area.

In an embodiment of the present invention, the weight values of the pixels corresponding to the first area and third area are equal to zero.

In an embodiment of the present invention, the high-pass processing circuit includes a high-pass filter to perform a high-pass filtering processing on the input video signal so as to produce a high-pass filtered video signal.

In an embodiment of the present invention, the high-pass processing circuit further includes a noise coring circuit coupled to the high-pass filter for removing a core component of the high-pass filtered video signal so as to form a decored video signal.

In an embodiment of the present invention, the image processing method further includes using a first multiplier to multiply the weighing signal by a gain so as to produce a gain signal, and using a second multiplier to multiply the gain signal by the decored video signal so as to produce a peaked signal.

In an embodiment of the present invention, the image processing method further includes using the low-pass filter to perform the low-pass filtering processing on the input video signal so as to produce a low-pass filtered video signal, and using an adder to add the low-pass filtered video signal to the peaked signal so as to produce a sharpened video signal.

In an embodiment of the present invention, the image processing method further includes using a delayer to delay the input video signal so as to produce a delayed video signal, and using an adder to add the delayed video signal to the peaked signal so as to produce a sharpened video signal.

The present invention also provides an image processing circuit for processing an input video signal so as to produce an output video signal. The input video signal contains pixel values of a plurality of pixels sequentially input. The image processing circuit includes a difference value adaptor, a low-pass filter, a high-pass processing circuit and a transient improvement circuit. The difference value adaptor is configured to produce a weighing signal and an area-identifying signal according to the pixel difference values of a plurality of pixels of the input video signal. The weighing signal contains weight values of the pixels and the area-identifying signal contains flag values of the pixels. Each of the flag value is configured to identify which of a first area, a second area and a third area the pixel difference value of the pixel corresponding to the flag value falls in. The low-pass filter is configured to perform a low-pass filtering processing on a first pixel having the pixel difference value falling in the first area among the pixels so as to obtain the pixel value of a first output pixel of the output video signal. The high-pass processing circuit is configured to perform a peaking processing on a second pixel having the pixel difference value falling in the second area among the pixels so as to obtain the pixel value of a second output pixel of the output video signal. The transient improvement circuit is configured to perform an LTI processing on a third pixel having the pixel difference value falling in the third area among the pixels so as to obtain the pixel value of a third output pixel of the output video signal.

In an embodiment of the present invention, the first area and second area are partially overlapped. The low-pass filter and high-pass processing circuit respectively perform the low-pass filtering processing and the peaking processing on the pixels with the pixel difference values falling in the overlapped portion of the first area and the second area among the pixels.

In an embodiment of the present invention, the second area and third area are partially overlapped. The high-pass filter and transient improvement circuit respectively perform the peaking processing and the LTI processing on the pixels with the pixel difference values falling in the overlapped portion of the second area and the third area among the pixels.

In an embodiment of the present invention, the second area has a first sub-area, a second sub-area and a third sub-area. The second sub-area is located between the first sub-area and the third sub-area. The weight values of the pixels corresponding to the second sub-area are greater than the weight values of the pixels corresponding to the first sub-area and the third sub-area.

In an embodiment of the present invention, the weight values of the pixels corresponding to the first area and third area are equal to zero.

In an embodiment of the present invention, the high-pass processing circuit includes a high-pass filter to perform a high-pass filtering processing on the input video signal so as to produce a high-pass filtered video signal.

In an embodiment of the present invention, the image processing circuit further includes a first multiplier for multiplying the weighing signal by a gain so as to produce a gain signal, wherein the high-pass processing circuit further includes: a noise coring circuit and a second multiplier; the noise coring circuit is coupled to the high-pass filter and is configured to remove a core component of the high-pass filtered video signal so as to form a decored video signal; a second multiplier is configured to multiply the gain signal by the decored video signal so as to produce a peaked signal.

In an embodiment of the present invention, the image processing circuit further includes a delayer and a first multiplexer. The delayer is configured to delay the input video signal so as to produce a delayed video signal, and the low-pass filter performs a low-pass filtering processing on the input video signal so as to produce a low-pass filtered video signal. The first multiplexer is configured to select one of the delayed video signal and the low-pass filtered video signal for outputting, and the high-pass processing circuit further includes an adder for adding the output of the first multiplexer to the peaked signal so as to produce a sharpened video signal.

In an embodiment of the present invention, the image processing circuit further includes a second multiplexer. The second multiplexer has three input terminals respectively coupled to the low-pass filter, high-pass processing circuit and transient improvement circuit. The second multiplexer selects corresponding pixels from the output of the low-pass filter, the output of the high-pass processing circuit and the output of the transient improvement circuit according to the area-identifying signal so as to produce the output video signal.

In an embodiment of the present invention, the image processing circuit further includes a second multiplexer. The second multiplexer has two input terminals respectively coupled to the low-pass filter and the high-pass processing circuit, and the output terminal of the second multiplexer is coupled to the transient improvement circuit. The second multiplexer selects corresponding pixels from the output of the low-pass filter and the output of the high-pass processing circuit according to the area-identifying signal and sends the selected pixels to the transient improvement circuit. The image processing circuit controls the transient improvement circuit according to the area-identifying signal and decides whether or not to perform the LTI processing on the output of the second multiplexer, and the output of the transient improvement circuit is just the output video signal.

Based on the description above, the present invention is able to select an appropriate processing to process each pixel of the input video signal according to the pixel difference value of the pixel, wherein the processing includes low-pass filtering processing, peaking processing, and LTI processing. On pixels with lower pixel difference values, the low-pass filtering processing is performed so that the corresponding area within a frame look more smooth; on pixels with higher pixel difference values, the LTI processing is performed so that no light contours and dark contours appear in the corresponding area within a frame. On pixels with moderate pixel difference values, the peaking processing is performed so that the profiles and the edges of the image objects in the corresponding area within a frame are more clear. In addition, the corresponding weight values of a sharpening processing are adaptively defined according to different pixel difference values, so that the frame after the sharpening processing looks more clear and natural.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 5:
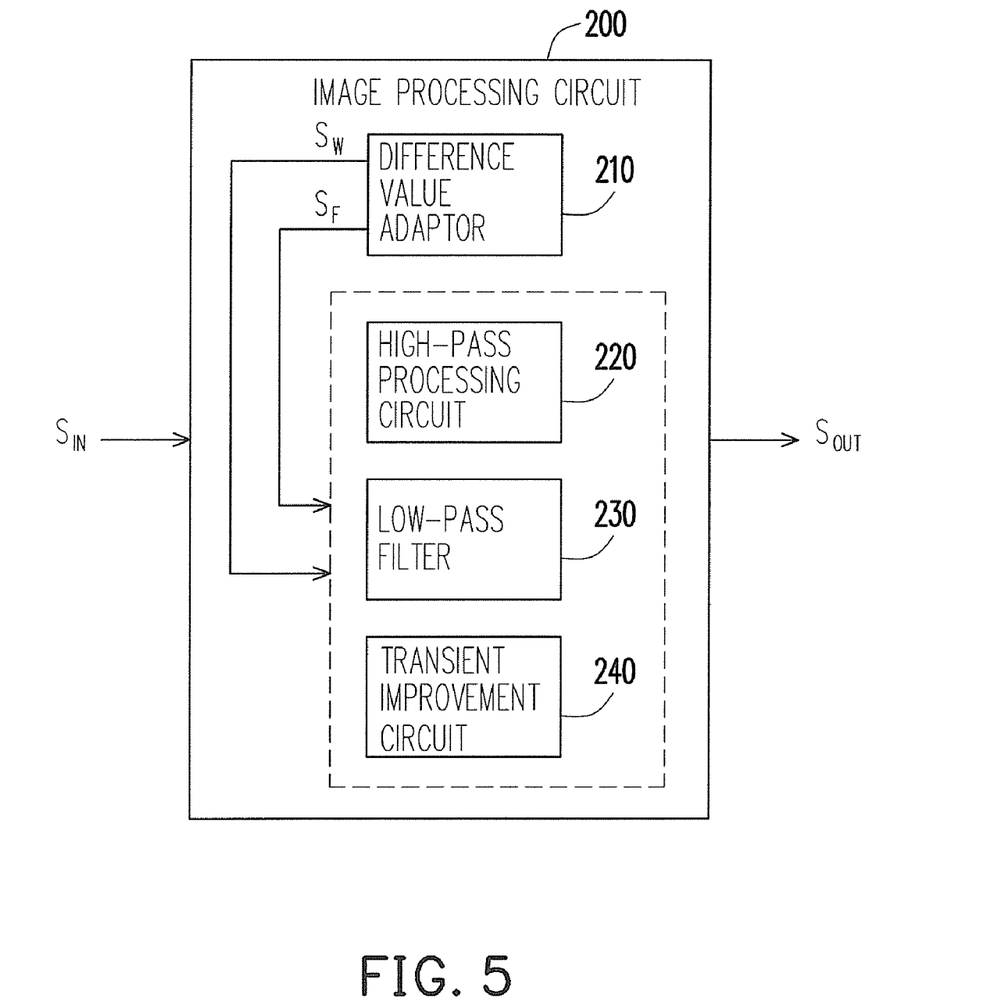
FIG. 5 is a function block diagram of an image processing circuit according to an embodiment of the present invention.
Figure 6:
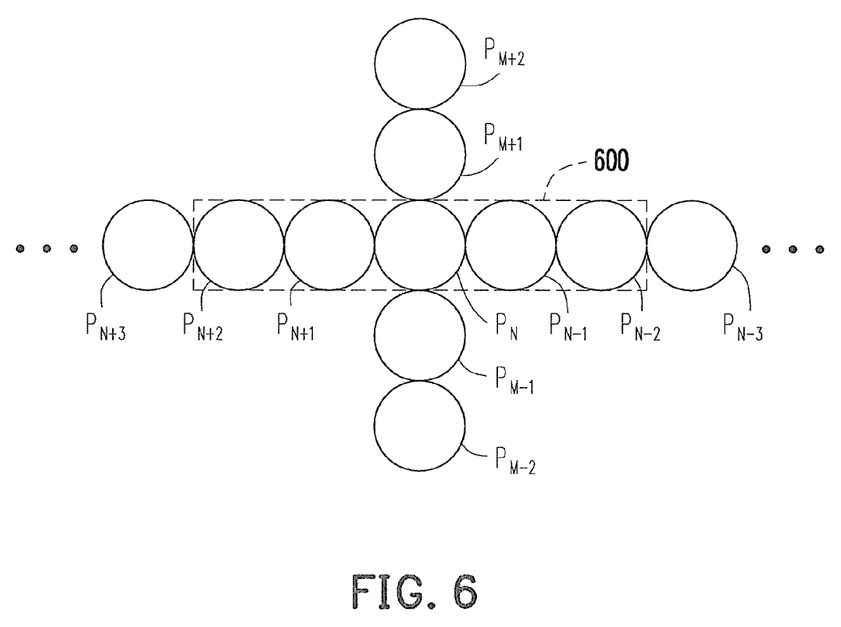
FIG. 6 is a diagram showing partial pixels of an input video signal according to an embodiment of the present invention.

FIG. 5 is a function block diagram of an image processing circuit 200 according to an embodiment of the present invention. Referring to FIG. 5, the image processing circuit 200 receives and processes an input video signal $S_{IN}$ so as to produce an output video signal $S_{OUT}$. The input video signal $S_{IN}$ carries the information of pixel values of a plurality of pixels used for a display to display a corresponding frame. The pixel values carried by the input video signal $S_{IN}$ are sequentially input to the image processing circuit 200. FIG. 6 is a diagram showing partial pixels of an input video signal $S_{IN}$ according to an embodiment of the present invention. Referring to FIG. 6, the pixel values of a plurality of pixels $P_{N-3}P_{N+3}$, $P_{M-2}P_{M-1}$ and $P_{M+1}$-$P_{M+2}$ are carried in the input video signal $S_{IN}$, wherein the pixel $P_N$ is the pixel presently processed by the image processing circuit 200, the pixels $P_{M-2}$-$P_{M-1}$ and the pixels $P_{M+1}$-$P_{M+2}$ are located on a same column as the $P_N$, and the pixels $P_{N-3}$-$P_{N-1}$ and the pixels $P_{N+1}$-$P_{N+3}$ are located on a same row as the $P_N$. The pixel values of the plurality of pixels carried by the input video signal $S_{IN}$ would be sequentially input to the image processing circuit 200. Taking the pixels $P_{N+1}$-$P_{N+3}$ as an example, the pixel values of the $P_{N-3}$, $P_{N-2}$, $P_{N-1}$, $P_N$, $P_{N+1}$, $P_{N+2}$ and $P_{N+3}$ would be sequentially input to the image processing circuit 200. In comparison with the input video signal $S_{IN}$ which carries the information of pixel values of a plurality of pixels, the output video signal $S_{OUT}$ produced by the image processing circuit 200 after accomplishing the processing on the input video signal $S_{IN}$ carries the information of pixel values of a plurality of pixels as well. Besides, the information of pixel value of any one pixel carried by the output video signal $S_{OUT}$ is obtained by the image processing circuit 200 after processing the corresponding pixel in the input video signal $S_{IN}$. In the embodiment, the pixel value is the luminance value of the pixel, which the present invention is not limited to.

The image processing circuit 200 has a difference value adaptor 210, which calculates the weight value corresponding to each pixel in the input video signal $S_{IN}$ so as to output a weighing signal $S_W$. In the embodiment, during calculating the weight values of pixels, the difference value adaptor 210 defines a window 600 as shown in FIG. 6. The window 600 contains the presently processed pixel $P_N$ and the pixels $P_{N-2}$, $P_{N-1}$, $P_{N+1}$ and $P_{N+2}$ all which are adjacent to the pixel $P_N$. In other words, in the embodiment, the window 600 contains the presently processed pixel $P_N$ and other four pixels adjacent to the pixel $P_N$. However, the number of the pixels in the window 600 is not limited to the above-mentioned quantity. For example, in other embodiments of the present invention, the window 600 can contain the pixels $P_{N-3}$-$P_{N-3}$, the pixels $P_{N-1}$-$P_{N+1}$ or other pixels. In addition, in the embodiment, the pixels contained by the window 600 are the pixels on a same pixel row in a frame, which the present invention is not limited to. For example, in another embodiment of the present invention, the window 600 can contain the presently processed pixel $P_N$ and other pixels located on a same column as $P_N$ (for example, the pixels $P_{M-2}$, $P_{M-1}$, $P_{M+1}$ and $P_{M+2}$.

Prior to calculating each weight value by the difference value adaptor 210, the difference value adaptor 210 would calculate the pixel difference value of the corresponding pixel first. Taking the pixel $P_N$ in FIG. 6 as an example, when the difference value adaptor 210 calculates the weight value of the pixel $P_N$, the difference value adaptor 210 would first calculate the pixel difference value $D_N$ corresponding to the pixel $P_N$ according to the pixel values of the pixels $P_{N-2}P_{N+2}$ in the window 600. In the embodiment, the pixel difference value $D_N$ is equal to the result of subtracting the minimal value among the pixel values of the pixels $P_{N-2}$-$P_{N+2}$ from the maximal value among the pixel values of the pixels $P_{N-2}$-$P_{N+2}$. As a result, the pixel difference value $D_N$ can be expressed by:

$$D_N = V_{max} - V_{min}$$

wherein $V_{max}$ is the maximal value among the pixel values of all the pixels in the window 600 and $V_{min}$ is the minimal value among the pixel values of all the pixels in the window 600.

It should be noted that the calculation way of the pixel difference value of each pixel is not limited to the description above. For example, in another embodiment of the present invention, the pixel difference value $D_N$ can be expressed by:

$$D_N = |V_{N+2}V - V_{N-2}| + |V_{N+1} - V_{N-1}|$$

wherein $V_{N+2}$, $V_{N+1}$, $V_{N-1}$ and $V_{N-2}$ respectively denote the pixel values of the pixels $P_{N+2}$, $P_{N+1}$, $P_{N-1}$ and $P_{N-2}$ in the window 600.

Figure 7:
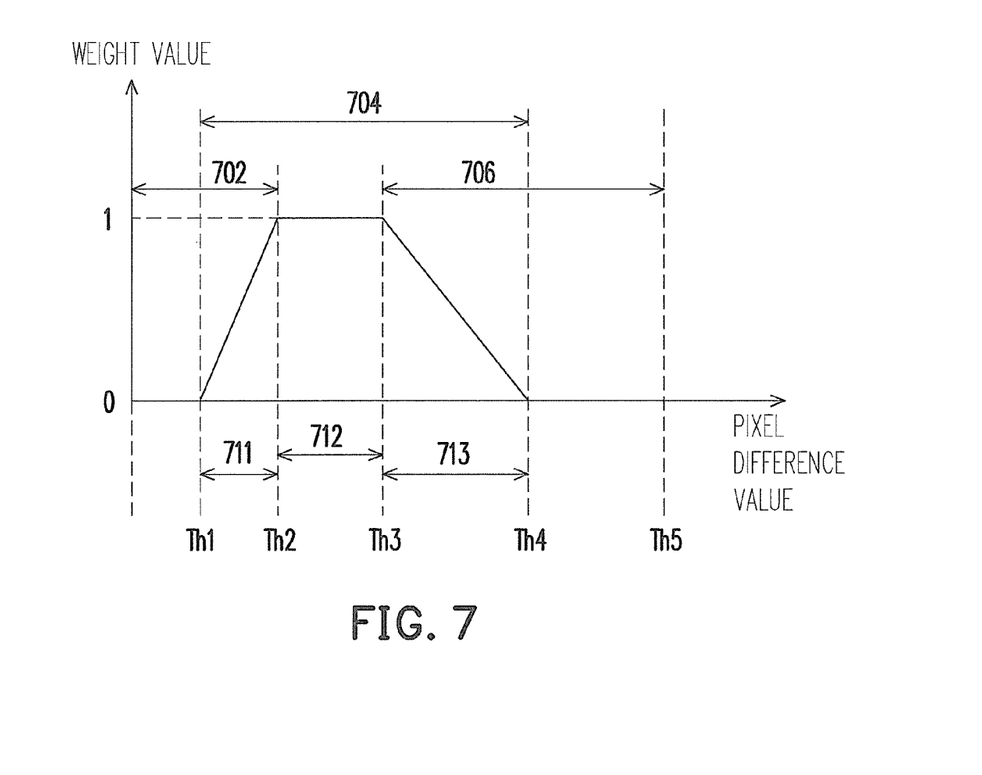
FIG. 7 is a chart showing the relationship between the pixel difference value and the weight value in an embodiment of the present invention.

After the difference value adaptor 210 calculates the pixel difference values of the pixels, the weight values of the pixels are output according to the pixel values, wherein the data of the weight value of each pixel output by the difference value adaptor 210 is carried in the weighing signal $S_W$. FIG. 7 is a chart showing the relationship between the pixel difference value and the weight value in an embodiment of the present invention. Referring to FIG. 7, when the pixel difference value of a pixel is less than a threshold Th1 or is between a threshold Th4 and a threshold Th5, the weight value of the pixel is equal to zero; when the pixel difference value of a pixel is between a threshold Th2 and a threshold Th3, the weight value of the pixel is equal to one; when the pixel difference value of a pixel is between the threshold Th1 and the threshold Th2 or between the threshold Th3 and the threshold Th4, the weight value of the pixel is between zero and one.

Figure 8:
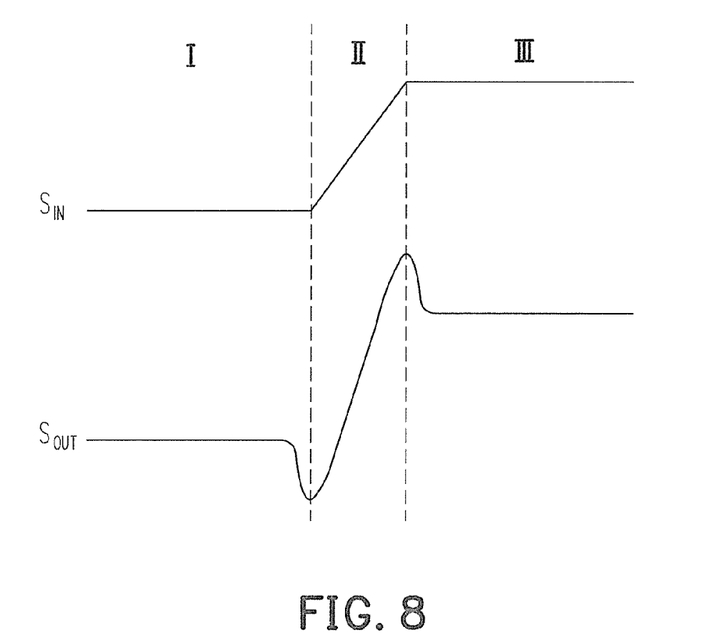
FIG. 8 is a chart showing a partial waveform of an input video signal and the partial waveform of the corresponding output video signal produced by the input video signal after receiving a high-pass filtering processing.

Continuing to FIG. 5, the image processing circuit 200 has also a high-pass processing circuit 220 for performing a peaking processing on the input video signal $S_{IN}$ according to the weight values carried by the weighing signal $S_W$. When the high-pass processing circuit 220 performs the above-mentioned peaking processing, the peaking extent of each pixel is somewhat different depending on the corresponding weight value. In more details, the peaking extent for each pixel after the peaking processing is proportional to the corresponding weight value. Besides, as the description above, the weight value of a pixel is related to the pixel difference value thereof, so that the peaking extent of each pixel is related to the pixel difference value thereof as well. FIG. 8 is a chart showing a partial waveform of an input video signal $S_{IN}$ and the partial waveform of the corresponding output video signal $S_{OUT}$ produced by the input video signal $S_{IN}$ after receiving a processing performed by the high-pass processing circuit 220. Referring to FIG. 8, the amplitudes of the input video signal $S_{IN}$ are positively related to the pixel values of the pixels; i.e., the larger the amplitude of the input video signal $S_{IN}$, the larger the corresponding pixel value is. On the contrary, the smaller the amplitude of the input video signal $S_{IN}$, the smaller the corresponding pixel value is. In FIG. 8, there are three areas I, II and III can be roughly distinguished from each other. The pixel values of the pixels corresponding to the areas I and II have smaller variations, but the pixel values of the pixels corresponding to the areas III have larger variations. In this case, the high-pass processing circuit 220 would decreases the amplitudes of the input video signal $S_{IN}$ located at the boundary between the areas I and II and increases the amplitudes of the input video signal $S_{IN}$ located at the boundary between the areas II and III so as to produce a corresponding output video signal $S_{OUT}$ after the peaking processing, and FIG. 8 shows the partial waveform of the output video signal $S_{OUT}$.

Figure 9:
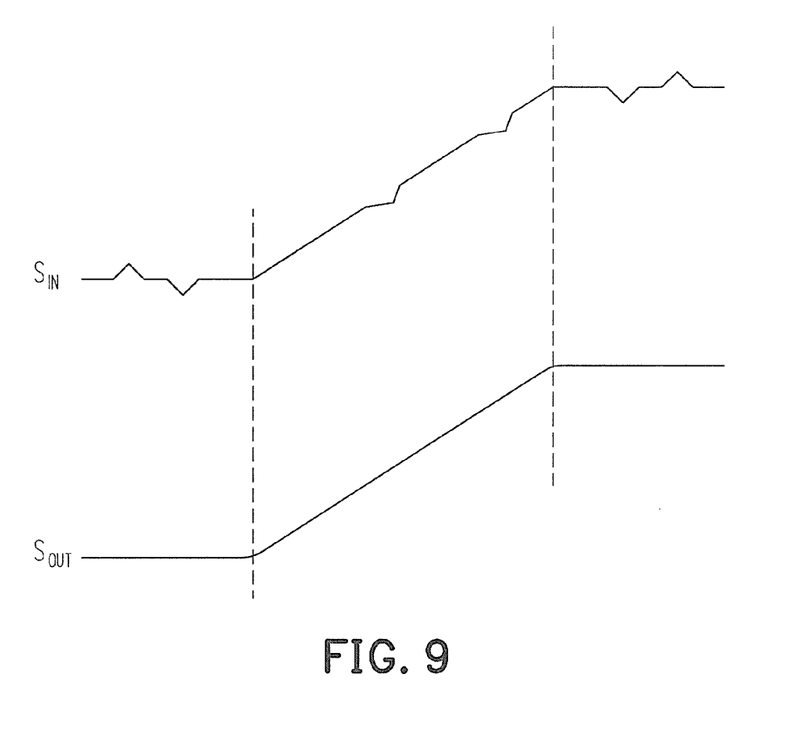
FIG. 9 is a chart showing a partial waveform of an input video signal and the partial waveform of the corresponding output video signal produced by the input video signal after receiving a low-pass filtering processing.

Referring to FIG. 5 again, the image processing circuit 200 further has a low-pass filter 230 for performing a low-pass filtering processing on a part of or all the pixels of the input video signal $S_{IN}$. FIG. 9 is a chart showing a partial waveform $S_{IN}$ of an input video signal and the partial waveform of the corresponding output video signal $S_{OUT}$ produced by the input video signal $S_{IN}$ after receiving a processing by the low-pass filter 230. Referring to FIG. 9, when the low-pass filter 230 performs the low-pass filtering processing on the input video signal $S_{IN}$, the information of the high-frequency components in the input video signal $S_{IN}$ is filtered out, but the information of the low-frequency components is left. In other words, the information of the pixel values carried by the input video signal $S_{IN}$ is averaged, so that the waveform of the output video signal $S_{OUT}$ is smoother than the waveform of the input video signal $S_{IN}$.

Figure 10:
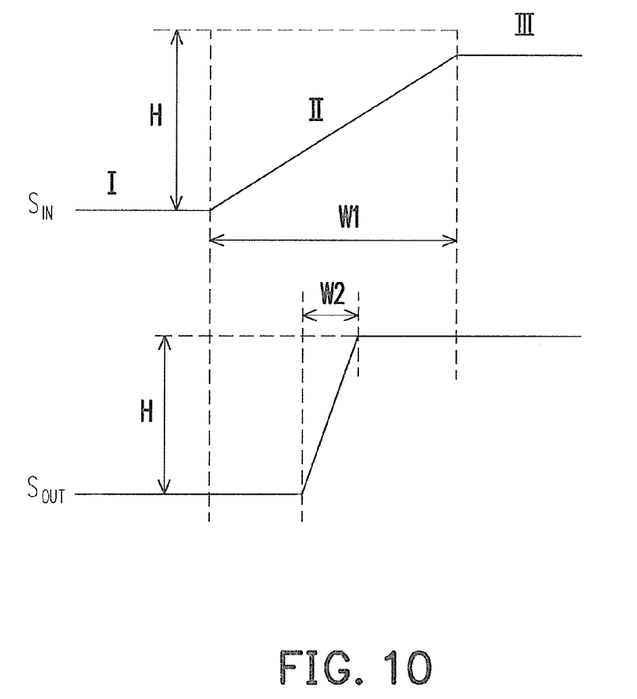
FIG. 10 is a chart showing a partial waveform of an input video signal and the partial waveform of the corresponding output video signal produced by the input video signal after receiving a transient improvement circuit's processing.

Continuing to FIG. 5, the image processing circuit 200 further has a transient improvement circuit 240 for performing an LTI processing on a part of or all the pixels of the input video signal $S_{IN}$. FIG. 10 is a chart showing a partial waveform of an input video signal $S_{IN}$ and the partial waveform of the corresponding output video signal $S_{OUT}$ produced by the input video signal $S_{IN}$ after receiving a processing of the transient improvement circuit 240. Referring to FIG. 10, when the transient improvement circuit 240 performs the LTI processing on the input video signal $S_{IN}$, the transient of the input video signal $S_{IN}$ within the amplitude-varied area would be shortened. In FIG. 10, there are three areas I, II and III can be roughly distinguished from each other. The pixel values of the pixels corresponding to the areas I and III have smaller variations, but the pixel values of the pixels corresponding to the areas II have larger variations. When the transient improvement circuit 240 performs the LTI processing, the duration (width) of the area II is shortened from W1 to W2, while the height of the area II is still kept to H. Due to the shortened width of the area II, the difference between the area I and the area III is more easily noticed in terms of visual effect, which leads to sharpening the images.

Referring to FIGS. 5 and 7, in addition to outputting the weighing signal $S_W$, the difference value adaptor 210 outputs an area-identifying signal $S_F$ as well, wherein the area-identifying signal $S_F$ has the flag values of the pixels and each flag value is used to identify which area among an first area 702, an second area 704 and an area 706 the pixel difference value of the pixel corresponding to the flag value falls in. The image processing circuit 200 controls the high-pass processing circuit 220, the low-pass filter 230 and the transient improvement circuit 240 to perform the corresponding processing on the input video signal $S_{IN}$ so as to produce the pixel value of the corresponding pixel of the output video signal $S_{OUT}$ according to the area-identifying signal $S_F$. In more details, the low-pass filter 230 performs the low-pass filtering processing on the pixels with the pixel difference values falling in the first area 702 (or termed as first pixels) so as to obtain the pixel values of first output pixels in the output video signal $S_{OUT}$; the high-pass processing circuit 220 performs the high-pass filtering processing on the pixels with the pixel difference values falling in the second area 704 (or termed as second pixels) so as to obtain the pixel values of second output pixels in the output video signal $S_{OUT}$; the transient improvement circuit 240 performs the LTI processing on the pixels with the pixel difference values falling in the third area 706 (or termed as third pixels) so as to obtain the pixel values of third output pixels in the output video signal $S_{OUT}$.

Referring to FIGS. 7 and 10, as the description above, when the input video signal $S_{IN}$ only receives the LTI processing performed by the transient improvement circuit 240, the height of the area II in the produced output video signal $S_{OUT}$ is still kept to H. The pixels processed by the transient improvement circuit 240 are the ones with the pixel difference values falling in the third area 706, and the pixel difference values of the pixels corresponding to the third area 706 are greater than the pixel difference values of the pixels corresponding to the first area 702 and the second area 704. As a result, for the pixels with larger pixel values in the input video signal $S_{IN}$, the maximal pixel value and the minimal pixel value thereof keep unchanged, which makes the displaying areas corresponding to the third area 706 in a frame have no light contours and dark contours.

As shown by FIG. 7, the second area 704 has a first sub-area 711, a second sub-area 712 and a third sub-area 713, wherein the second sub-area 712 is located between the first sub-area 711 and the third sub-area 713. The weight values of the pixels corresponding to the second sub-area 712 are greater than the weight values of the pixels corresponding to the first sub-area 711 and the third sub-area 713. In addition, the first area 702 and the second area 704 are partially overlapped within the first sub-area 711, and the second area 704 and the third area 706 are partially overlapped within the third sub-area 713. The pixels with the pixel difference values falling in the first sub-area 711 would receive the low-pass filtering processing and the peaking processing, while the pixels with the pixel difference values falling in the third sub-area 713 would receive the peaking processing and the LTI processing.

Figure 11:
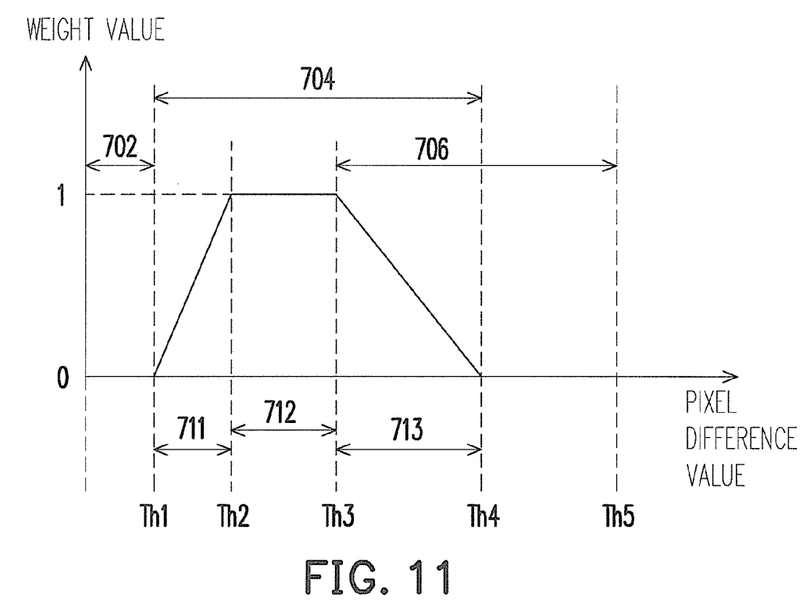
FIGS. 11-13 are charts showing the relationships between the pixel difference values and the weight values in different embodiments of the present invention.
Figure 12:
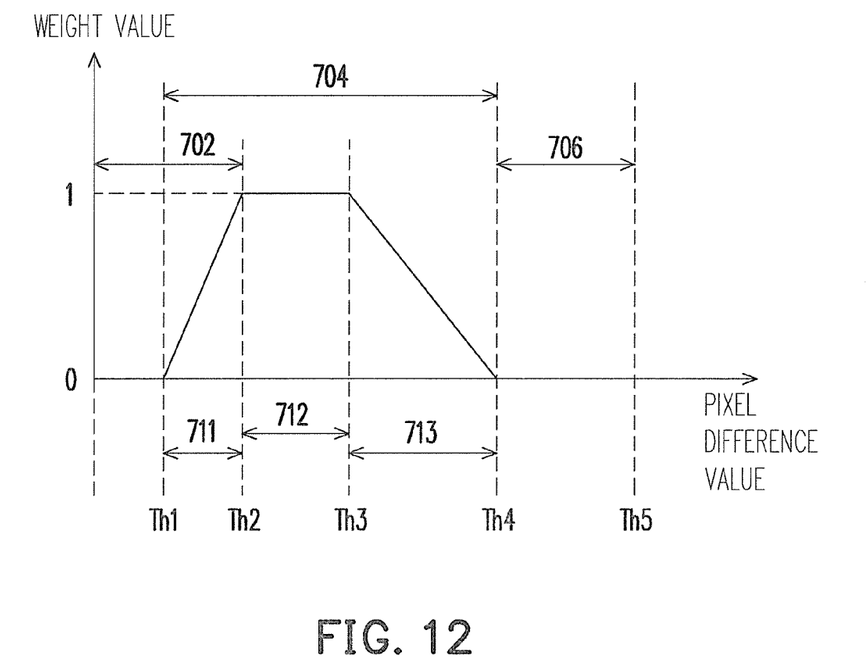
Figure 13:
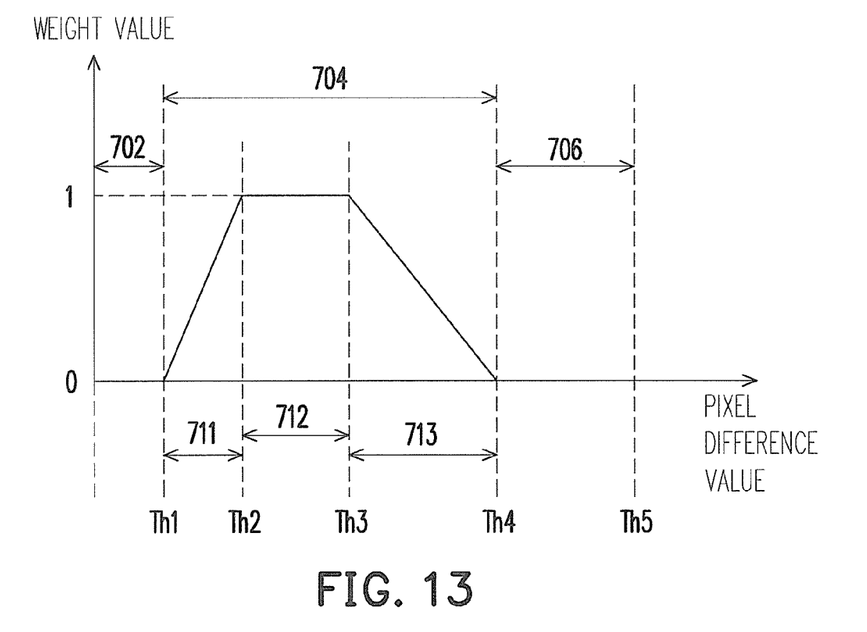

In the embodiment, the second area 704 is respectively partially overlapped with the first area 702 and with the third area 706, which the present invention is not limited to. FIGS. 11-13 are charts showing the relationships between the pixel difference values and the weight values in different embodiments of the present invention. Referring to FIGS. 11-13, in the embodiment corresponding to FIG. 11, the first area 702 and the second area 704 are not overlapped, but the third area 706 is partially overlapped with the second area 704. In the embodiment corresponding to FIG. 12, the first area 702 and the second area 704 are partially overlapped, but the third area 706 and the second area 704 are not overlapped. In the embodiment corresponding to FIG. 13, both the first area 702 and the third area 706 are not overlapped with the second area 704. In addition, in the embodiment corresponding to FIG. 13, the weight values of the pixels corresponding to the first area 702 and the third area 706 are equal to zero.

Figure 14:
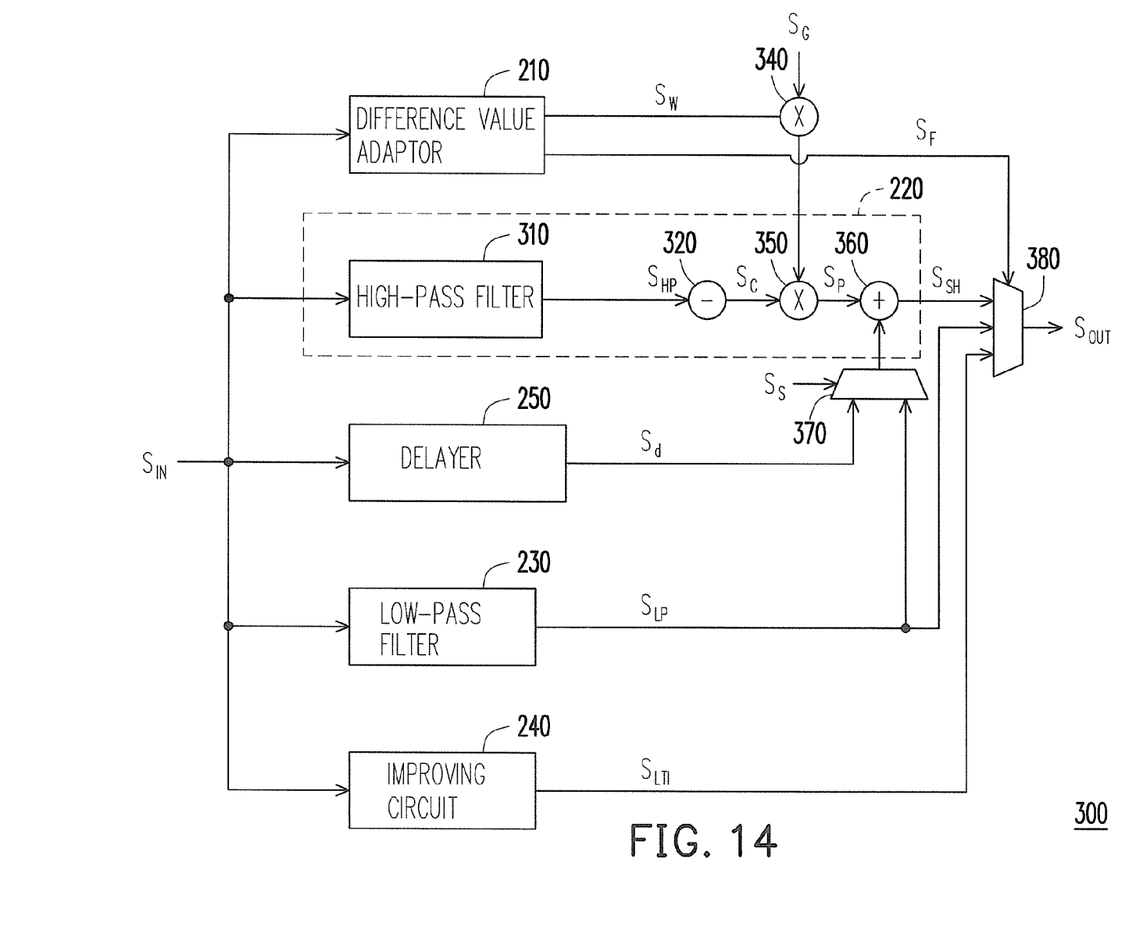
FIG. 14 is a function block diagram of an image processing circuit according to another embodiment of the present invention.

FIG. 14 is a function block diagram of an image processing circuit 300 according to another embodiment of the present invention. Referring to FIG. 14, the image processing circuit 300 has a difference value adaptor 210, a high-pass processing circuit 220, a low-pass filter 230 and a transient improvement circuit 240. The parts 210, 220, 230 and 240 have the same functions as descriptions above, and the functions thereof are omitted to describe.

Figure 15:
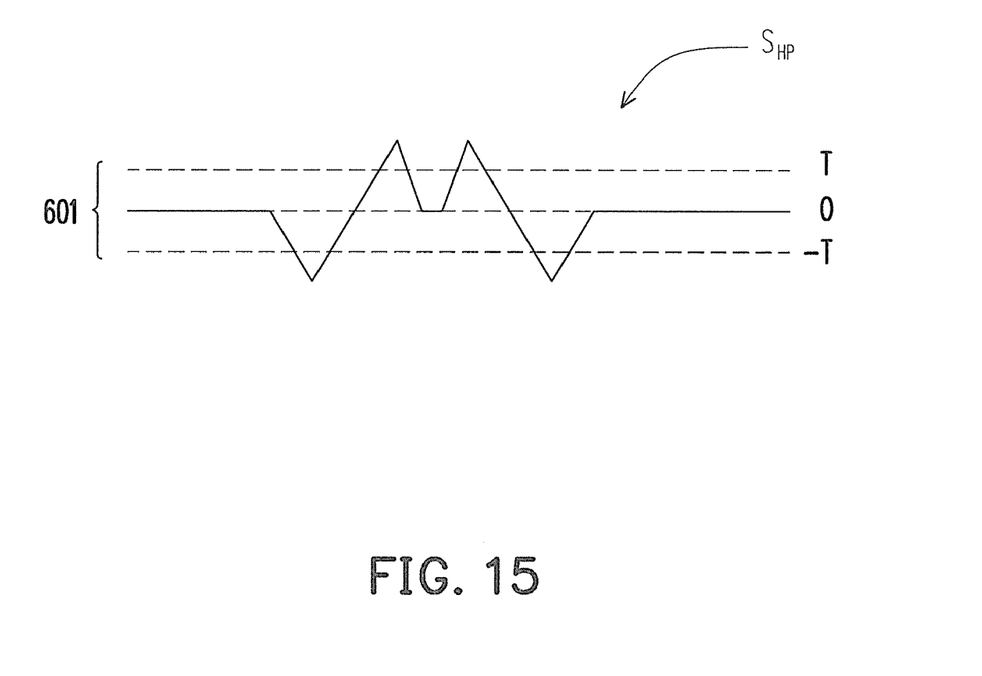
FIG. 15 is a partial timing diagram of a high-pass filtered video signal according to an embodiment of the present invention.
Figure 16:
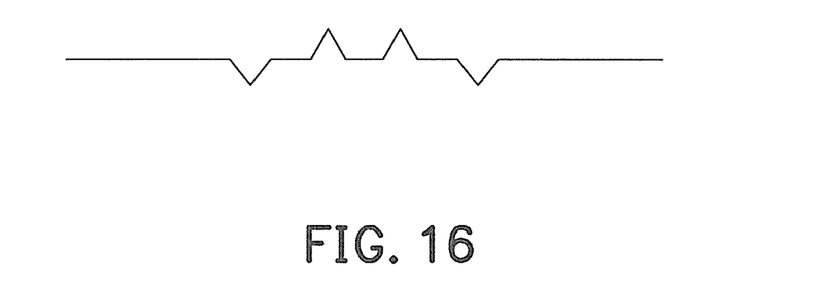
FIG. 16 is a partial timing diagram of a decored video signal produced by a high-pass filtered video signal after receiving a noise coring circuit's processing.

The high-pass processing circuit 220 of the image processing circuit 300 has a high-pass filter 310 and a noise coring circuit 320. The high-pass filter 310 performs a high-pass filtering processing on the input video signal $S_{IN}$ so as to produce a high-pass filtered video signal $S_{HP}$. The noise coring circuit 320 is coupled to the high-pass filter 310 for removing the core component of the high-pass filtered video signal $S_{HP}$ so as to form a decored video signal $S_C$. FIG. 15 is a partial timing diagram of a high-pass filtered video signal $S_{HP}$ according to an embodiment of the present invention and FIG. 16 is a partial timing diagram of a decored video signal $S_C$ produced by the high-pass filtered video signal $S_{HP}$ after receiving the processing performed by the noise coring circuit 320. Referring to FIGS. 15 and 16, the noise coring circuit 320 would define the core component 410 of the high-pass filtered video signal $S_{HP}$ between a threshold T and another threshold −T. As shown by FIG. 16, after the noise coring circuit 320 removes the core component 410 of the high-pass filtered video signal $S_{HP}$, a decored video signal $S_C$ is produced.

Referring to FIG. 14 again, the low-pass filter 230 of the image processing circuit 300 performs the low-pass filtering processing on the input video signal $S_{IN}$ so as to produce a low-pass filtered video signal $S_{LP}$. The image processing circuit 300 further has a delayer 250 and a first multiplexer 370. The delayer 250 delays the input video signal $S_{IN}$ so as to produce a delayed video signal $S_d$. The first multiplexer 370 selects one of the low-pass filtered video signal $S_{LP}$ and delayed video signal $S_d$ for output according to the control signal $S_S$, wherein the control signal $S_S$ is produced by the difference value adaptor 210 according to the pixel difference values. In an embodiment of the present invention, the control signal $S_S$ can be the area-identifying signal $S_F$, and the first multiplexer 370 selects one of the low-pass filtered video signal $S_{LP}$ and delayed video signal $S_d$ for output according to the area-identifying signal $S_F$.

It should be noted that the overlapping of the first area 702 and the second area 704 in FIGS. 12 and 13 can be affected according to the different definitions of the first area and the second area. For example, in an embodiment of the present invention, when the pixel difference value of a pixel is less than the threshold Th1, the first multiplexer 370 would select the low-pass filtered video signal $S_{LP}$ for output; when the pixel difference value of a pixel is greater than or equal to the threshold Th1, the first multiplexer 370 would select the delayed video signal $S_d$ for output, where the first area 702 and the second area 704 are not overlapped, as shown by FIG. 13. In another embodiment of the present invention, when the pixel difference value of a pixel is less than the threshold Th2, the first multiplexer 370 would select the low-pass filtered video signal $S_{LP}$ for output; when the pixel difference value of a pixel is greater than or equal to the threshold Th2, the first multiplexer 370 would select the delayed video signal $S_d$ for output, where the first area 702 and the second area 704 are overlapped, as shown by FIG. 14.

The image processing circuit 300 has also a first multiplier 340, which multiplies the weighing signal $S_W$ by a gain $S_G$ so as to produce a gain signal $S_E$. In the embodiment, the gain $S_G$ is used to specify an overall gain for the high-pass processing circuit 220 to perform the peaking processing. Usually, the gain $S_G$ is adjustable. In this way, the peaking processing performed by the high-pass processing circuit 220 can be flexibly adjusted to meet different application requirements.

The high-pass processing circuit 220 has also a second multiplier 350 and an adder 360. The second multiplier 350 multiplies the gain signal $S_E$ by the decored video signal $S_C$ so as to produce a peaked signal $S_P$, wherein the peaked signal $S_P$ contains the high-frequency information of the input video signal $S_{IN}$. The adder 360 adds the peaked signal $S_P$ to the output of the first multiplexer 370 so as to produce a sharpened video signal $S_{SH}$.

In addition, the transient improvement circuit 240 performs the LTI processing on the input video signal $S_{IN}$ so as to produce an LTI video signal $S_{LTI}$. The image processing circuit 300 further has a second multiplexer 380, which can select one of the sharpened video signal $S_{SH}$, low-pass filtered video signal $S_{LP}$ and LTI video signal $S_{LTI}$ for output according to the area-identifying signal $S_F$. Referring to FIGS. 12-14, when the pixel difference value of a pixel is less than the threshold Th1, the second multiplexer 380 would select the low-pass filtered video signal $S_{LP}$ for output; when the pixel difference value of a pixel is between the threshold Th1 and the threshold Th4, the second multiplexer 380 would select the sharpened video signal $S_{SH}$ for output; when the pixel difference value of a pixel is greater than the threshold Th4, the second multiplexer 380 would select the LTI video signal $S_{LTI}$ for output.

Figure 17:
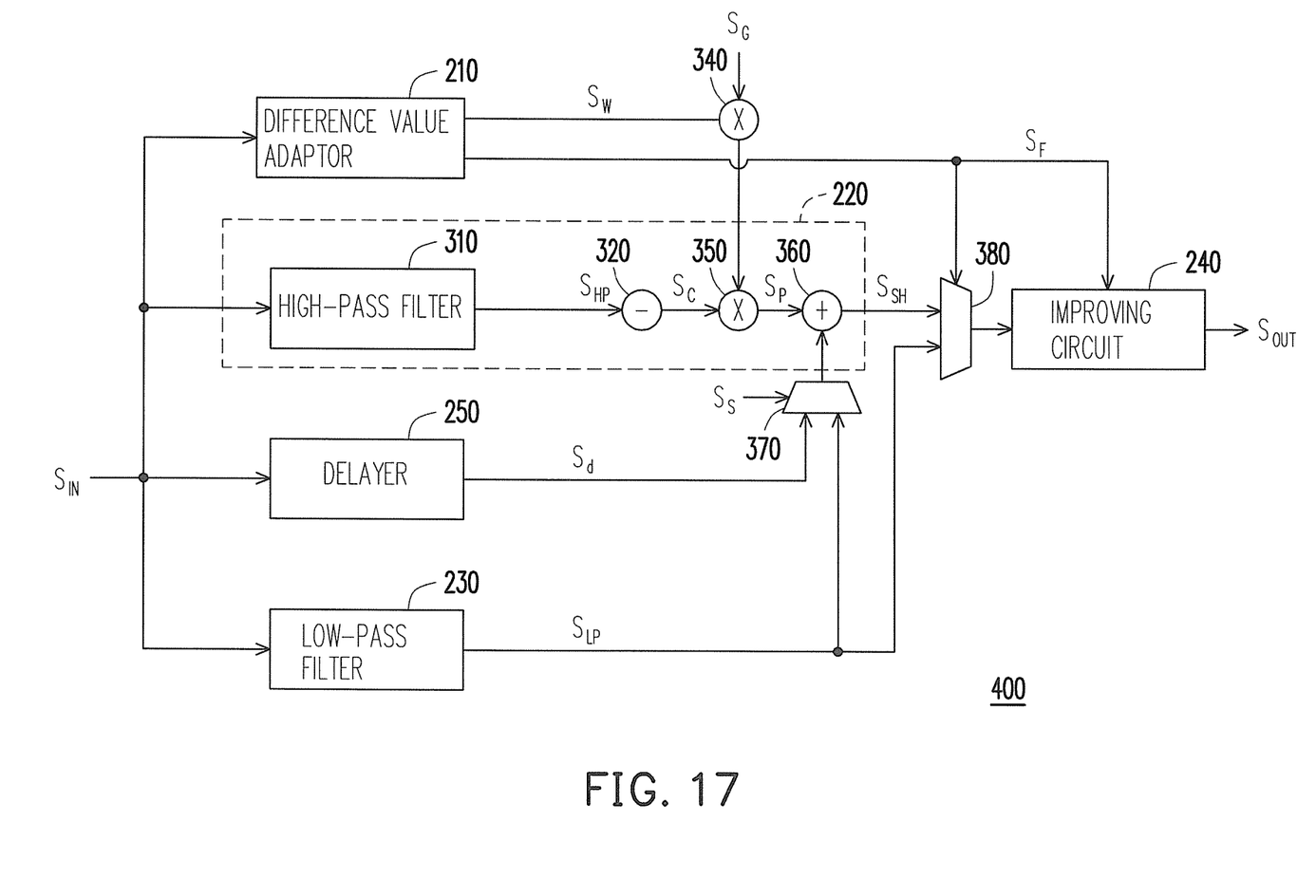
FIG. 17 is a function block diagram of an image processing circuit according to further another embodiment of the present invention.

FIG. 17 is a function block diagram of an image processing circuit 400 according to further another embodiment of the present invention. Referring to FIG. 17, the image processing circuit 400 is similar to the image processing circuit 300, but the major difference of the image processing circuit 400 from the image processing circuit 300 rests in that the transient improvement circuit 240 of the image processing circuit 400 is coupled to the output terminal of the second multiplexer 380, and the second multiplexer 380 of the image processing circuit 400 selects one of the sharpened video signal $S_{SH}$ and low-pass filtered video signal $S_{LP}$ for output according to the area-identifying signal $S_F$. For the other components of the image processing circuit 400, for example, the difference value adaptor 210, the high-pass processing circuit 220, the delayer 250, the low-pass filter 230 and so on, the functions thereof are the same as that of the image processing circuit 300, so that they are omitted to describe.

In the embodiment, the image processing circuit 400 controls the second multiplexer 380 and selects one of the sharpened video signal $S_{SH}$ and low-pass filtered video signal $S_{LF}$ for output according to the weighing signal $S_W$. On the other hand, the image processing circuit 400 also controls the transient improvement circuit 240 according to the area-identifying signal $S_F$ so as to decide whether or not to perform the LTI processing on the output of the second multiplexer 380. When the transient improvement circuit 240 does not perform the LTI processing on the output of the second multiplexer 380, the output signal of the transient improvement circuit 240 is just the output signal of the second multiplexer 380.

Referring to FIGS. 17, 7 and 11-13, when the pixel difference value of a pixel is less than the threshold Th1, the second multiplexer 380 would select the low-pass filtered video signal $S_{LP}$ for output; when the pixel difference value of a pixel is greater than the threshold Th1, the second multiplexer 380 would select the sharpened video signal $S_{SH}$ for output.

In the embodiments corresponding to FIGS. 7 and 11, when the pixel difference value of a pixel is greater than the threshold Th3, the transient improvement circuit 240 would perform the LTI processing on the output of the second multiplexer 380; when the pixel difference value of a pixel is less than or equal to the threshold Th3, the transient improvement circuit 240 would not perform the LTI processing on the output of the second multiplexer 380.

In the embodiments corresponding to FIGS. 12 and 13, when the pixel difference value of a pixel is greater than the threshold Th4, the transient improvement circuit 240 would perform the LTI processing on the output of the second multiplexer 380; when the pixel difference value of a pixel is less than or equal to the threshold Th4, the transient improvement circuit 240 would not perform the LTI processing on the output of the second multiplexer 380.

In summary, the present invention can select an appropriate processing to process each pixel of the input video signal according to the pixel difference value of the pixel. The processing way includes low-pass filtering processing, peaking processing and LTI processing. On pixels with smaller pixel difference values, the low-pass filtering processing is performed, so that the corresponding areas in a frame look smoother. On pixels with larger pixel difference values, the LTI processing is performed, so that within the corresponding areas in a frame, there are no light contours and dark contours. On pixels with modest pixel difference values, the peaking processing is performed, so that the profiles and the edges within the corresponding areas in a frame look clearer. In addition, the weight value corresponding to the peaking processing can be adaptively set according to different pixel difference values, so that the frame after the peaking processing looks clearer and neutral.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An image processing method, for processing an input video signal so as to produce an output video signal, the input video signal containing pixel values of a plurality of pixels; the input video signal comprising:
   producing a weighing signal and an area-identifying signal according to pixel difference values of the plurality of pixels of the input video signal, wherein the weighing signal contains weight values of the pixels, the area-identifying signal contains flag values of the pixels, and each of the flag values is configured to identify which of a first area, a second area and a third area the pixel difference value of the pixel corresponding to the flag value falls in;
   utilizing a low pass filter to perform a low-pass filtering processing on a first pixel among the pixels, wherein the pixel difference value of the first pixel falls in the first area, so that the pixel value of a first output pixel in the output video signal is obtained;
   utilizing a high-pass processing circuit to perform peaking processing on a second pixel among the pixels, wherein the pixel difference value of the second pixel falls in the second area, so that the pixel value of a second output pixel in the output video signal is obtained; and
   utilizing a transient improvement circuit to perform luminance transient improvement (LTI) processing on a third pixel among the pixels, wherein the pixel difference value of the third pixel falls in the third area, so that the pixel value of a third output pixel in the output video signal is obtained.

2. The image processing method as claimed in claim 1, wherein the first area and the second area are partially overlapped, and the image processing method further comprises:
   performing the low-pass filtering processing and the peaking processing on those pixels among the pixels, wherein the pixel difference values of those pixels fall in the overlapped portion of the first area and the second area.

3. The image processing method as claimed in claim 1, wherein the second area and third area are partially overlapped, and the image processing method further comprises:
   performing the peaking processing and the luminance transient improvement processing on those pixels among the pixels, wherein the pixel difference values of those pixels fall in the overlapped portion of the second area and the third area.

4. The image processing method as claimed in claim 1, wherein the second area has a first sub-area, a second sub-area and a third sub-area, the second sub-area is located between the first sub-area and the third sub-area, and the weight values of the pixels corresponding to the second sub-area are greater than the weight values of the pixels corresponding to the first sub-area and the third sub-area.

5. The image processing method as claimed in claim 1, wherein the weight values of the pixels corresponding to the first area and third area are equal to zero.

6. The image processing method as claimed in claim 1, wherein the high-pass processing circuit comprises a high-pass filter to perform high-pass filtering processing on the input video signal so as to produce a high-pass filtered video signal.

7. The image processing method as claimed in claim 6, wherein the high-pass processing circuit further comprises a noise coring circuit coupled to the high-pass filter for removing a core component of the high-pass filtered video signal so as to form a decored video signal.

8. The image processing method as claimed in claim 7, further comprising:
   multiplying the weighing signal by a gain by using a first multiplier so as to produce a gain signal; and
   multiplying the gain signal by the decored video signal by using a second multiplier so as to produce a peaked signal.

9. The image processing method as claimed in claim 8, further comprising:
   performing the low-pass filtering processing on the input video signal to produce a low-pass filtered video signal; and
   utilizing an adder to add the low-pass filtered video signal to the peaked signal so as to produce a sharpened video signal.

10. The image processing method as claimed in claim 8, further comprising:
    delaying the input video signal so as to produce a delayed video signal; and
    adding the delayed video signal to the peaked signal so as to produce a sharpened video signal.

11. An image processing circuit, for processing an input video signal so as to produce an output video signal, wherein the input video signal contains pixel values of a plurality of pixels sequentially input; the image processing circuit comprising:
    a difference value adaptor, for producing a weighing signal and an area-identifying signal according to the pixel difference values of the plurality of pixels of the input video signal, wherein the weighing signal contains weight values of the pixels and the area-identifying signal contains flag values of the pixels, and each of the flag value is configured to identify which of a first area, a second area and a third area the pixel difference value of the pixel corresponding to the flag value falls in;
    a low-pass filter, for performing a low-pass filtering processing on a first pixel having the pixel difference value falling in the first area among the pixels so as to obtain the pixel value of a first output pixel of the output video signal;

a high-pass processing circuit, for performing a peaking processing on a second pixel having the pixel difference value falling in the second area among the pixels so as to obtain the pixel value of a second output pixel of the output video signal; and a transient improvement circuit, for performing a luminance transient improvement (LTI) processing on a third pixel having the pixel difference value falling in the third area among the pixels so as to obtain the pixel value of a third output pixel of the output video signal.

12. The image processing circuit as claimed in claim 11, wherein the first area and the second area are partially overlapped, and the low-pass filter and the high-pass processing circuit respectively perform the low-pass filtering processing and the peaking processing on the pixels having the pixel difference values falling in the overlapped portion of the first area and the second area among the pixels.

13. The image processing circuit as claimed in claim 11, wherein the second area and third area are partially overlapped, and the high-pass filter and the transient improvement circuit respectively perform the peaking processing and the luminance transient improvement processing on the pixels having the pixel difference values falling in the overlapped portion of the second area and the third area among the pixels.

14. The image processing circuit as claimed in claim 11, wherein the second area has a first sub-area, a second sub-area and a third sub-area, the second sub-area is located between the first sub-area and the third sub-area, and the weight values of the pixels corresponding to the second sub-area are greater than the weight values of the pixels corresponding to the first sub-area and the third sub-area.

15. The image processing circuit as claimed in claim 11, wherein the weight values of the pixels corresponding to the first area and third area are equal to zero.

16. The image processing circuit as claimed in claim 11, wherein the high-pass processing circuit comprises a high-pass filter to perform a high-pass filtering processing on the input video signal so as to produce a high-pass filtered video signal.

17. The image processing circuit as claimed in claim 16, further comprising a first multiplier for multiplying the weighing signal by a gain so as to produce a gain signal, wherein the high-pass processing circuit further comprises:

a noise coring circuit, coupled to the high-pass filter for removing a core component of the high-pass filtered video signal so as to form a decored video signal; and a second multiplier, for multiplying the gain signal by the decored video signal so as to produce a peaked signal.

18. The image processing circuit as claimed in claim 17, further comprising a delayer and a first multiplexer, wherein the delayer is configured to delay the input video signal so as to produce a delayed video signal, and the low-pass filter performs the low-pass filtering processing on the input video signal so as to produce a low-pass filtered video signal; the first multiplexer is configured to select one of the delayed video signal and the low-pass filtered video signal for outputting, and the high-pass processing circuit further comprises an adder for adding the output of the first multiplexer to the peaked signal so as to produce a sharpened video signal.

19. The image processing circuit as claimed in claim 11, further comprising a second multiplexer, wherein the second multiplexer has three input terminals respectively coupled to the low-pass filter, the high-pass processing circuit and the transient improvement circuit; the second multiplexer selects corresponding pixels from the output of the low-pass filter, the output of the high-pass processing circuit and the output of the transient improvement circuit according to the area-identifying signal so as to produce the output video signal.

20. The image processing circuit as claimed in claim 11, further comprising a second multiplexer having two input terminals and an output terminal, wherein the two input terminals are respectively coupled to the low-pass filter and the high-pass processing circuit, the output terminal is coupled to the transient improvement circuit, the second multiplexer selects corresponding pixels from the output of the low-pass filter and the output of the high-pass processing circuit according to the area-identifying signal and sends the selected pixels to the transient improvement circuit, the image processing circuit controls the transient improvement circuit according to the area-identifying signal and decides whether or not to perform the luminance transient improvement processing on the output of the second multiplexer, and the output of the transient improvement circuit is just the output video signal.

* * * * *